United States Patent [19]
Happel

[11] 3,874,338
[45] Apr. 1, 1975

[54] MILKING CUP

[76] Inventor: Fritz Happel, Schwarzwaldstr, 17, 722 Schwenninger, Germany

[22] Filed: Oct. 5, 1973

[21] Appl. No.: 404,113

[30] Foreign Application Priority Data
Oct. 9, 1972 Switzerland.................... 14741/72
Apr. 9, 1973 Germany........................ 2317732

[52] U.S. Cl. ............................................. 119/14.53
[51] Int. Cl. ..................................................... A01j 5/16
[58] Field of Search............ 119/14.31, 14.53, 14.52

[56] References Cited
UNITED STATES PATENTS

| | | | |
|---|---|---|---|
| 1,044,246 | 11/1912 | Reid................................ | 119/14.31 |
| 1,089,838 | 3/1914 | Hulbert.......................... | 119/14.31 |
| 1,465,002 | 8/1923 | Schawang...................... | 119/14.31 |
| 2,334,481 | 11/1943 | Da Silveira..................... | 119/14.53 |
| 2,470,169 | 5/1949 | Howse............................ | 119/14.53 |

Primary Examiner—Hugh R. Chamblee
Attorney, Agent, or Firm—Amster & Rothstein

[57] ABSTRACT

A milking cup comprises a tubular casing and a resiliently deformable sleeve extending through the casing and sealingly secured to each end of the casing. The inner space of the sleeve receives a nipple of an animal to be milked and the sleeve defines with the casing an outer space which can be connected by means of an aperture in the casing to a source of varying pressure, especially alternately applied vacuum and atmospheric pressure. At least one expandible body is provided in the outer space for exerting pressure on the sleeve to massage the nipple and, also in the outer space, an arrangement is provided which, depending on the relative pressures of the inner and outer space, controls the expansion and contraction of the expandible body. Preferably, both the expandible body and the said arrangement comprise fluid-filled cushions, the inner volumes of which are connected, fluid being transferred between the cushions depending on movement of the sleeve relative to the casing.

11 Claims, 5 Drawing Figures

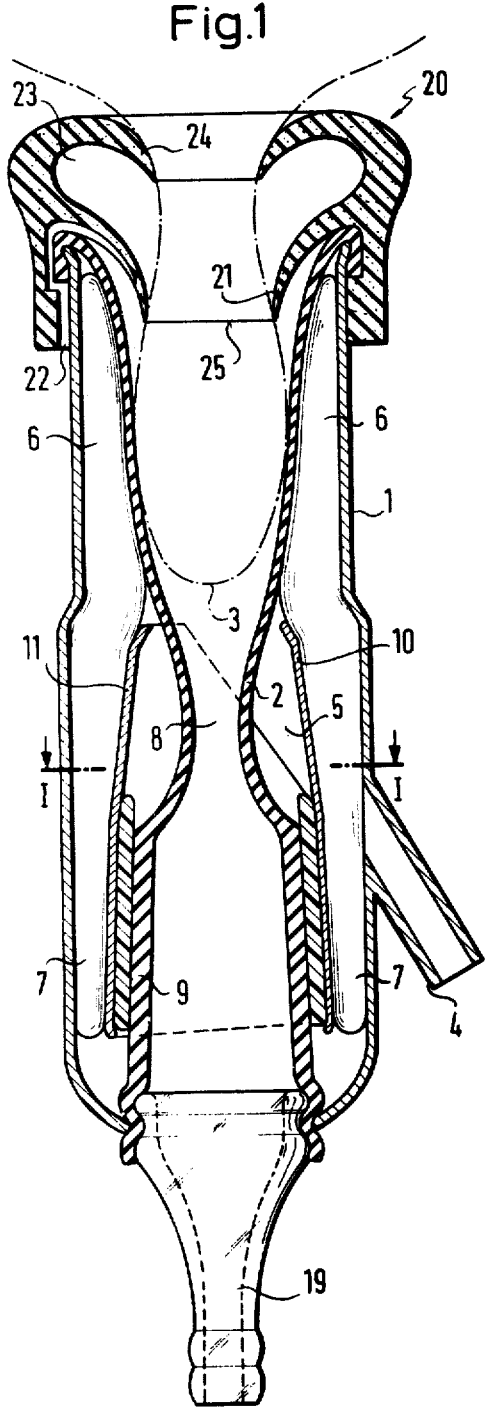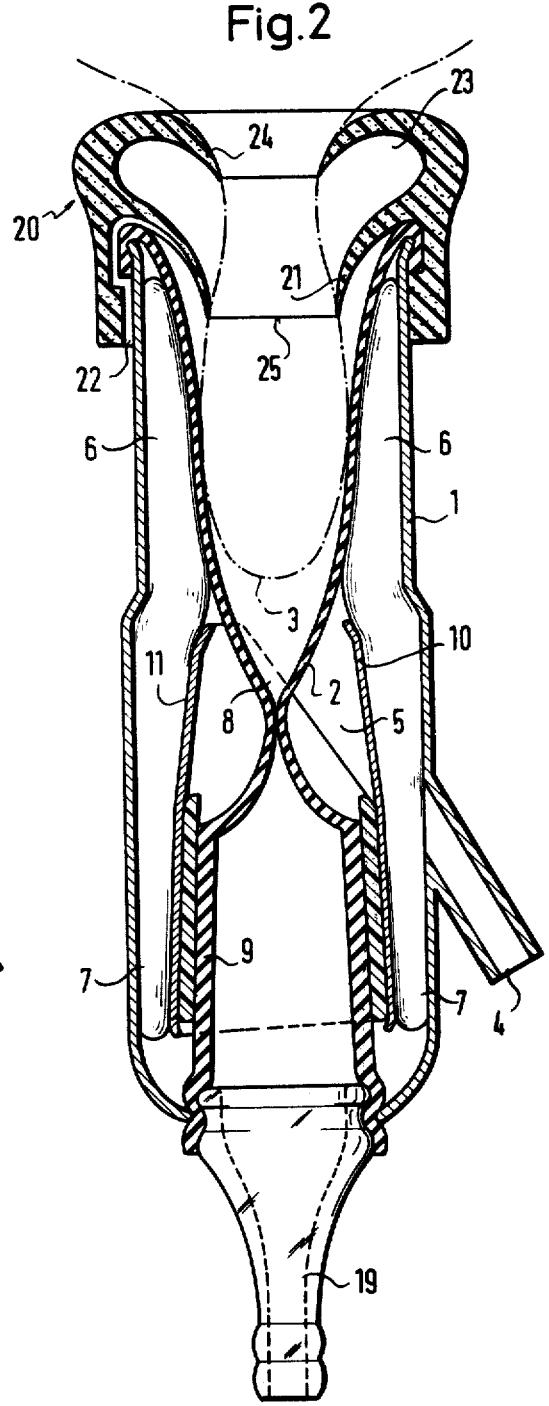

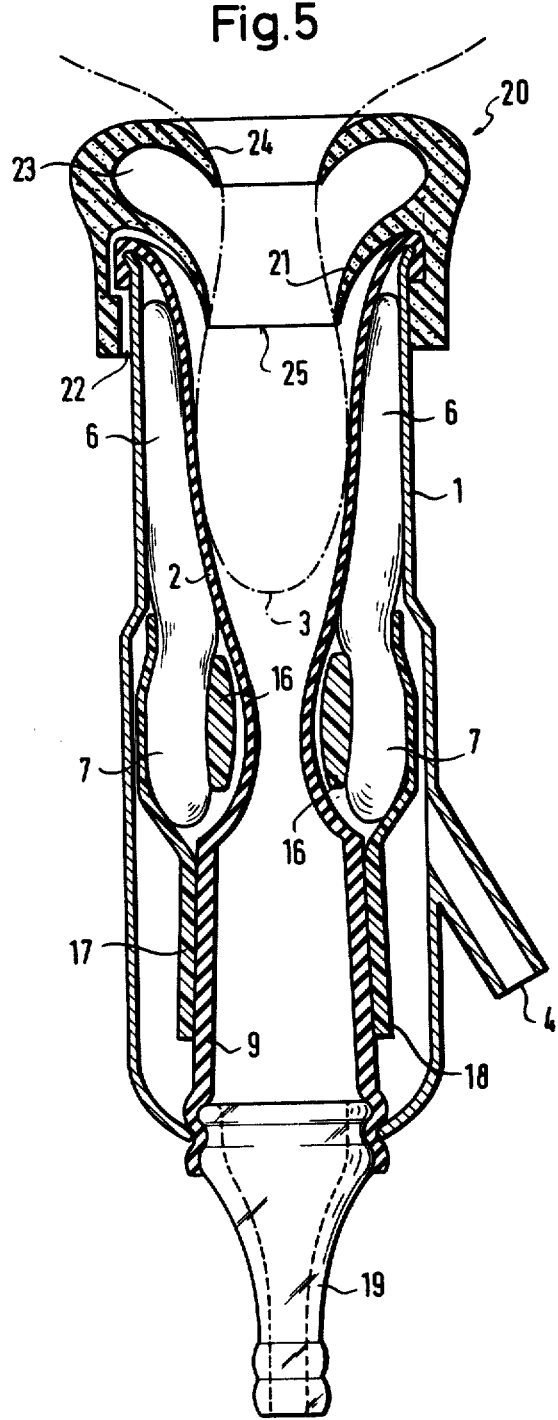

3,874,338

MILKING CUP

This invention relates to milking cups, particularly of the type comprising a casing, a sleeve extending through the casing to receive a nipple and sealingly secured to each end of the casing, a connection opening into a pulsation space defined by the sleeve and the casing and supplied automatically with vacuum and pressure, and an arrangement for nipple massage.

A milking cup of this type is known from German AS No. 1,298,773. One significant problem with such milking cups which work with low pressure in the inner space of the nipple-receiving sleeve arises because of the need, during the massage phase, to avoid a vacuum at the nipple so as to minimise damage to the nipple tissue. Also with these known milking cups, it is difficult to arrange for the connection of the inner space of the sleeve to the vacuum source before the end of the pressure massage. Such a method of working is particularly advantageous but up to now could only be achieved by additional and therefore costly control devices.

The object of the present invention is to construct a milking cup of the above-described type which, with a particularly simple construction and without the need for additional control devices separate from the milking cup, can achieve an almost complete release of the vacuum at the nipple during the massage phase and can also achieve an optimal support for the nipple both during the sucking phase and during the massage phase and in particular also during the transition between these phases. This can be simply achieved by automatically varying the pressure applied to the milking cup, especially alternately applying a vacuum and atmospheric pressure. Furthermore, this milking cup can be cleaned without difficulty and adheres effectively to the nipple during the milking process.

According to the invention, a milking cup comprises a tubular casing, a resiliently deformable sleeve extending through the casing to receive a nipple and sealingly secured to each end of the casing to form an inner space and an outer space, an aperture opening to the outer space for application of varying pressures to the outer space, at least one expandible body in the outer space for exerting pressure on the sleeve to massage the nipple and an arrangement in the outer space which, depending on the pressure difference between the inner and outer spaces, controls the expansion or contraction of the massaging body.

Preferably the lower part of the sleeve inner space is connected permanently to a vacuum source and the outer space is supplied alternately with atmospheric pressure and vacuum.

Preferably, the extendible body is a fluid-filled massage cushion and the arrangement which controls the volume alteration of the massage cushion consists of at least one control cushion with walls flexible at least in part, the inner volume of which is in connection with the inner volume of the massage cushion. It is further at times preferable to construct the control and massage cushion pair, which work together, in the form of a one-piece cushion. In this way, a particularly simple construction arrangement is achieved; for example two opposed cushions can be used which extend over practically the entire length of the milking cup casing and fulfil simultaneously the function of control cushion and massage cushion, whereby in dependence on the operating phase at any time a part of the fluid medium is stored in either the upper or the lower part of the cushion.

Preferably a throttle portion is provided between the control and massage cushions. Such a throttle portion is not absolutely necessary but can, depending on the particular embodiment of the invention chosen, be advisable as by means of such a portion the desired time-lag for the massage on the nipple after disconnection of the nipple from the vacuum and the subsequent release of the vacuum at the nipple to atmospheric pressure can be achieved. The same throttle portion acts during the transition from the massage phase to the sucking phase so that first the sleeve opens and thereby puts the nipple under vacuum while, by reason of the reduced back-flow of the pressure medium into the control cushion, the nipple is still supported by the massage cushion and remains embedded in this. A further preferable feature of the milking cup according to the invention is that a capping portion is provided which has a thin-walled elastic sealing stocking extending radially inwardly and with a central opening, the diameter of which in the unstretched state of the sealing stocking is at least somewhat smaller than the diameter of a nipple at the corresponding place.

By this means, the adhesion of the milking cup during the release of the vacuum is improved as the sealing stocking acts like a check valve and hinders an immediate change in the pressure in the head room provided between the sealing stocking and a closing lip of the capping portion. The build up of the vacuum in the sucking phase in the said head room is not disturbed by the sealing stocking.

Further particulars of the invention are described in the following with particular reference to the illustrated embodiments in which:

FIG. 1 is a schematic longitudinal section of one embodiment of the milking cup in the sucking phase;

FIG. 2 is a corresponding longitudinal section to FIG. 1 of the milking cup at the point of shutting off the vacuum;

FIG. 5 is a schematic longitudinal view of a further embodiment of the milking cup.

Figure 3:
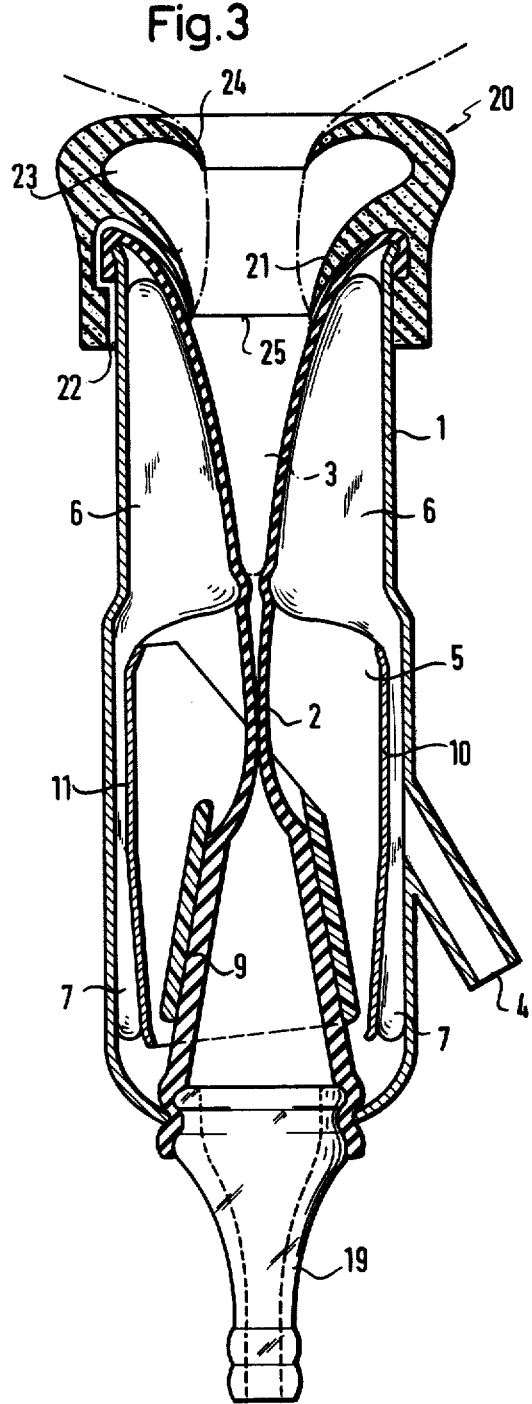
FIG. 3 is a longitudinal section of the milking cup corresponding to FIG. 1 during the massage phase.

According to FIG. 1, the milking cup comprises a casing 1 through which a resilient rubber sleeve 2 extends. In the usual way the sleeve is tightly stretched over both ends of the casing. At the upper end a capping portion 20 is provided which surrounds a nipple 3. At the lower end of the casing 1 is a sight glass or connector 19 which, in use, is connected permanently to a vacuum source.

The sleeve 2 divides the casing space into an inner space 8 and an outer pulsation space 5. The pulsation space 5 is connectable via a connector 4 alternately with a vacuum source and with atmosphere.

In the outer space 5 there are provided two fluid-filled cushions 6 and 7 stretching over practically the entire length of the casing 1 and diametrically opposed, whereby the part of the cushion lying in the region of the nipple 3 has the function of a massage cushion and the part in the lower half of the casing, that is below the nipple region, has the function of a control cushion.

The respective control cushion parts 7 are located between the casing wall and control devices 10 and 11 which in cross section are substantially U-shaped and which are secured to the region 9 of the sleeve lying at the sight glass end. The bond between the control devices 10 and 11 and the region 9 of the nipple rubber can be fixed or detachable, i.e., rigid or movable.

Figure 4:
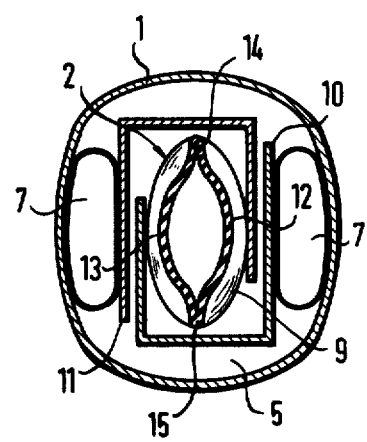
FIG. 4 is a schematic cross-section corresponding to line I—I in FIG. 1.

From the cross-section in FIG. 4 it can be seen that the two control devices 10, 11 which are, in cross-section, substantially U-shaped and which are secured in opposed positions to the sleeve 2, lie with their end remote from the end which is in contact with the sleeve 2 against the diametrically opposed control cushion 7, and can press against this control cushion 7.

The nipple rubber 2, apart from the strengthened region 9, is formed with relatively thin walls having for example a wall thickness in the region 0.5 – 1.00 mm. This small wall thickness is possible as the sleeve according to the invention need not, as is usual, be suitable for massage purposes, but fulfils practically exclusively support and control functions. The sleeve 2 in the region for effecting a cutting off of the vacuum in the sleeve inner space 8, is of a flattened oval form with double wall regions 14, 15 at the sides, as seen in FIG. 4. These double wall regions 14, 15 may for example be formed by folding the subsequent two sides 12, 13 together and subsequently heating the crimped edges. This construction of the sleeve is particularly advantageous as it is possible to achieve completely tight contact between the sides 12, 13 and the desired absolutely tight closing of the sleeve inner space 8 from the vacuum can be realised in a particularly simple manner.

It should also be mentioned that these double wall regions, 14 15 may be simply spread open so that there remain practically no difficultly accessible places and the cleaning of the nipple rubber can be performed without difficulties.

The double wall regions, 14 15 may also be clamped together from outside, for example by a removable clamping arrangement or by a clamping arrangement operable from outside. For example, for this purpose there may be used a clamping ring which has a central opening such that it does not interfere with the movements of the sleeve and is provided in its inner walls with diametrically opposed slits in which the sleeve can be clamped to achieve the double wall regions 14, 15.

The single piece control and massage cushions, 6, 7 in the exemplified constructions have a special merit above all because of their simplicity and effectiveness. These cushions comprise a soft material and for this reason can fit particularly well over the shape of the nipple 3 to act as massage cushions and almost completely surround the nipple during the massage phase.

To achieve the necessary time-lag between the actuation of the control cushion 7 and the operation of the massage cushion 6 a suitable throttle portion can be provided.

The method of working of the milking cup according to the invention is now more exactly described with reference to FIGS. 1–3.

FIG. 1 shows the milking cup in the sucking phase in which the milking cup inner space 8 and with it also the nipple 3 is under vacuum and the milked milk flows out through the sight glass 19. The sleeve 2 takes up its fully opened position as the outer space 5 also is under vacuum during this phase and there is therefore practically no pressure difference.

The actuating controls 10 and 11 for the control cushion 7 take up the position also shown in FIG. 4, i.e., practically no pressure is exerted by the actuating controls 10, 11 on the control cushion 7. In the case where a fluid pressure medium is used in the cushion, the medium is at least predominantly in the lower region of the cushion, i.e., in the region of the control cushion 7.

FIG. 2 shows the milking cup in the transition phase from sucking to massage. By introduction of atmospheric pressure into the outer or pulsation space 5 there becomes a pressure difference between the outer space 5 and the sleeve inner space 8 which leads to the immediate pressing together in its oval region of the sleeve 2 which, because of its small wall thickness, is very flexible, and to the hermetic sealing of the actual nipple space from the vacuum source. Because of the resultant reduction of the space in the nipple-receiving area the nipple is immediately relieved, that is the tip of the nipple finds itself in an environment at practically atmospheric pressure. Simultaneously with the pressing together of the thin walled nipple rubber, the thick wall region 9 of the nipple rubber is also moved radially inwards and thereby actuates the plate like elements 10 and 11 which press against the control cushion 7 and thus urge a working medium in the control cushions upwards into the massage cushion 6.

FIG. 3 shows the milking cup during the massage phase whereby it can be seen that during this phase the control cushion has a minimal volume and the massage cushion a maximal volume whereby the nipple 3 is massaged and supported in an optimal manner. It is preferable that the thin walled sleeve 2 gives practically no resistance to the massage cushion 6 and thus its conformation to the nipple shape is not hindered. In this way even the tip of the nipple can be practically fully supported which, especially during the subsequent transition to the sucking phase, is very advantageous as the sudden vacuum does not meet a partly unsupported nipple tip but rather an ideally supported and thereby protected tip.

As already mentioned, a throttle portion between the massage cushion 6 and the control cushion 7 can be provided in certain embodiments of the milking cups so as to control the volume of variation of the massage cushion 6 so that the beginning and ending of the nipple massage can be exactly controlled.

It must however also be said that this throttle portion is not absolutely necessary as the particular construction of the cushion can be used to give a reduction in the pressure medium flow and thereby to achieve the desired time sequence of the massage operation.

It can readily be seen that during the transition from the massage phase shown in FIG. 3 to the sucking phase represented in FIG. 1 the volume in the control cushion 7 is increased and the volume in the massage cushion 6 is again reduced as a result of the relative pressures in the sleeve inner space and in the pulsation space 5.

In the milking cup constructions according to FIGS. 1–3 and 5 there is also preferably provided a capping portion 20 which surmounts the upper end of the sleeve 2 and is formed detachable therefrom. The capping portion is provided with a thin walled elastic sealing stocking 21 which extends radially inwardly and lies against the nipple 3 whereby between the seaing lip 24 and the sealing stocking 21 (with its sealing edge 25) a head room 23 is formed. The advantage of using this thin walled sealing stocking 21 is, above all, that it operates similarly to a check valve and prevents an immediate vacuum release of the head room 23 during the release phase, while in no way disturbing the onset of vacuum in the sucking phase. In this way the adhesion of the milking cup to the nipple is significantly improved and is made essentially independent of the working phase.

Preferably, a passage is provided between the sleeve inner space beneath the sealing stocking 21 and atmosphere via a groove 22 running between the milking cup casing 1 and the capping portion 20. By means of this passage a ventilation of the nipple rubber inner space is achieved which assists in the flow of milk and yet by virtue of the sealing stocking the adhesion of the milking cup to the nipple is not worsened, as this adhesion is controlled by the conditions in the enclosed head room 23.

FIG. 5 shows a further embodiment of a milking cup according to the invention which is differentiated from the milking cup in FIGS. 1–3 merely in that the control cushion 7 is located between shell-shaped control members 17, 18 in contact with the nipple rubber in its strengthened region 9 and a support wall 16 which is radially within the control cushion 7 and is fixed in position by suitable means relative to the casing 1. The method of operation of this embodiment is not in any way different from that of the milking cup of FIGS. 1–3. The milking cup according to the invention has, above all, the merit that it makes possible an optimal process according to German AS No. 1,298,773 with a constructive simplicity because of the use of a thin walled nipple rubber and soft massage cushion giving an optimal imitation of the tongue of a sucking calf and thereby induces a very effective milking. Also it should be mentioned that cleaning of this milking cup can be carried out with no problems as there are no parts which are difficult to clean and all working can be absolutely hygienic.

The assembly of the milking cup casing, the massage and control cushions and the sleeve can be carried out according to different ways known in the art. It is for example also possible to prepare the necessary cushions, the sleeve and the control elements as detachable parts and to provide the casing if necessary with stud fastenings. The massage cushion can be so formed that during the sucking phase the cushion inner walls are pleated whereby the distance between the casing and the nipple rubber can be correspondingly reduced. If necessary control cushions and pressure cushions can also be made by forming between the nipple rubber and the milking cup casing an elastic, preferably rubber, separating wall which is sealingly fixed to both ends of the casing and which is filled with a pressure medium in the space lying between this separating wall and the casing, whereby simultaneous control and massage cushions are obtained and a trouble free massage for the nipple is achieved.

In order to ensure that on replacement of the nipple rubber the relative position between the sleeve and the casing as well as the control and massage cushions is always the same, preferably markings or fitting connections are provided on the ends of the casing and on the clamping portions of the sleeve.

The above described capping portion can also, if desired, be varied so that in place of the sealing stocking a sealing lip or a sealing ring is provided so that in any case the head room 23 will remain but in this head room the nipple is not led through a stocking-shaped piece.

Further, it may be desirable to form the sleeve in its region for the vacuum closure with especially thin walls, i.e., somewhat thinner than the region in contact with the nipple. Thereby the vacuum seal can be made more easily and the construction of the sleeve also technically simpler.

It was already said that to achieve a trouble free closure of the inner space from the vacuum source outside the sucking phase a sleeve can be used which is of oval form and has a double wall region at its closure part. If one does not want to use this double wall region it is especially advantageous to use instead a part which in cross-section has the form of a rectangle with rounded narrow sides. The sleeve at its rounded part is full, i.e., under a slight tension, while along its substantially parallel side walls it is normally slack with a small distance between these side walls. As opposed to already known inserts, the sleeve of this construction is open only during the sucking phase and otherwise is substantially closed. This is of significance in that closing of the inner space from the vacuum source can be achieved absolutely surely and very quickly at the beginning of the massage phase.

What I claim is:

1. A milking cup comprising
    a tubular casing;
    a resilient deformable sleeve located in said casing to extend therethrough forming an inner space to receive a nipple therein;
    said sleeve secured to the ends of said tubular casing to form a longitudinally extending outer space between said sleeve and said casing;
    at least one hollow body variable in volume and extending longitudinally through said outer space;
    said body comprising an upper massage portion that is variable in volume to exert pressure on said sleeve as it surrounds a nipple held therein and further comprising a lower control portion, said massage portion and said control portion having their inner volumes connected together;
    an aperture formed in said casing and opening to said outer space for application of varying pressures to said outer space, said varying pressure controlling contraction of the volume of said control portion to effect a corresponding change and expansion of the volume of said massage portion, and further allowing expansion of said control portion with corresponding contraction of said massage portion.

2. A milking cup according to claim 1 wherein control device means is located in said outer space, and said lower portion is located between said control device means and said casing.

3. A milking cup according to claim 2 wherein said control device means comprise two rigid U-shaped elements having legs fitting within each other.

4. A milking cup according to claim 2 wherein a support wall is provided between said sleeve and said control portion, and said control device means comprise a plurality of shell-shaped members.

5. A milking cup according to claim 1 wherein two hollow bodies are provided that are diametrically located in said outer space.

6. A milking cup according to claim 1 wherein said upper and lower portions are formed of substantially elastic walls.

7. A milking cup according to claim 1 wherein said massage portion includes an end extending substantially to the end of said outer space.

8. A milking cup according to claim 1 wherein said sleeve has a thickened strengthened portion adjacent said control portion.

9. A milking cup according to claim 1 wherein said sleeve includes longitudinally extending crimped edges connected by substantially flat walls, and closure of said sleeve is effected by fastening together said crimped edges.

10. A milking cup according to claim 1 wherein a capping portion having a central opening for the nipple is provided in the form of a thin-walled flexible stocking fitted over an end of said casing adjacent said massage portion.

11. A milking cup according to claim 10 wherein a passage connected to atmosphere is provided between said casing and said capping portion.

* * * * *